May 24, 1932.  E. BASEMAN  1,860,305

DUSTPROOF BEARING

Filed May 19, 1930

INVENTOR:
ERNEST BASEMAN.

BY  ATTORNEYS.

Patented May 24, 1932

1,860,305

UNITED STATES PATENT OFFICE

ERNEST BASEMAN, OF TORONTO, ONTARIO, CANADA, ASSIGNOR TO MASSEY-HARRIS COMPANY, LIMITED, OF TORONTO, ONTARIO, CANADA

DUSTPROOF BEARING

Application filed May 19, 1930. Serial No. 453,752.

This invention relates to means for preventing the entry of dust or other foreign matter into bearings, such as the disc bearings of agricultural machines.

The invention is especially applicable to the bearings of seeding drills of the disc type. Difficulty has been experienced with the discs of such machines as the bearings of the discs are liable to be clogged with dust, especially when the discs are employed on loose, sandy soil. The clogging of the bearings prevents rotation of the discs so that the wear of the discs is no longer uniformly distributed over the periphery of the disc. Various devices including spring-pressed metal rings have been proposed for the purpose of excluding the dust and dirt from the bearings but none of these proposals has been entirely satisfactory. It is not usually commercially practicable to machine the bearings and metal rings, and it is not permissible to employ strong springs to press the rings against the bearing, as this would stop or impede the rotation of the discs and thus destroy the object of the dust-excluding devices.

The object of this invention is to provide an efficient and durable device which will exclude the dust from the bearing without affecting the free rotation of the disc.

According to the present invention the foreign matter is successfully prevented from entering the bearing by a combination and cooperation of a washer of resilient material, such as felt, and a metal ring.

The invention consists in the construction, combination and arrangement of parts hereinafter fully described and more particularly pointed out in the appended claims.

Referring now to the accompanying drawings, which illustrate, by way of example, convenient embodiments of the invention:—

Figure 1:
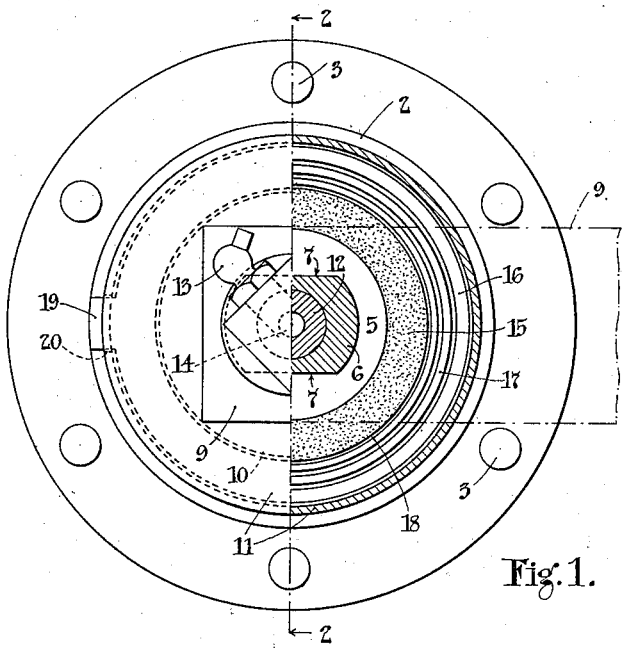
Figure 1 is on the left-hand side a front elevation of one form of the invention, and on the right-hand side a section on line 1—1 of Figure 2.

The central portion of a disc is indicated at 1. A bearing 2 of any suitable construction is coaxial with the disc and is secured thereto by means of rivets 3. Rotatably mounted in the bearing 2 is the circular flange 4 of a cylindrical supporting member 5 which is reduced in diameter at its outer end 6, the latter being flattened as at 7.

The reduced end 6 is inserted into a correspondingly shaped hole 8 in a supporting arm 9 which is attached to the seeder or other agricultural machine, not shown, a washer 10 and flanged disc 11 being interposed between the cylindrical portion 5 and the arm 9. A bolt 12 is screwed into a threaded bore in the member 5—6 and clamps the flange 4, washer 10 and disc 11 to the arm 9. Lubricant may be inserted into the bearing through a fitting 13 by way of a passage 14 in the bolt 12.

Figure 2:
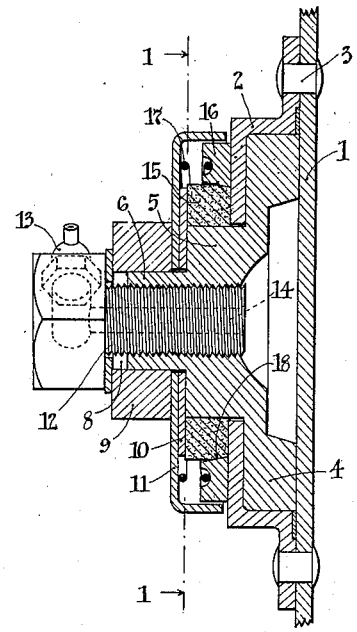
Figure 2 is a section on line 2—2 of Figure 1.

According to the illustrated form of the invention, dust or other foreign matter is prevented from entering the bearing 2 by the means which will now be described. A washer 15 of felt or similar compressible material closely surrounds the cylindrical member 5 between the washer 10 and the flat, outer surface of the bearing 2. A metal ring 16 surrounds the felt washer 15 and is pressed into engagement with the bearing 2 by a spring 17, which is compressed between the ring 16 and disc 11. The compression of the spring 17 is very slight as it is not permissible to impose any undue friction upon the bearing 2, as the latter must be able to rotate freely. It is also important that the inner surface of the ring 16 be bevelled with respect to the felt washer 15. It will be seen from Figure 2 that the inner surface 18 of the ring 16 tapers towards the bearing 2, and at its smaller end is of slightly smaller diameter than the normal outer diameter of the felt washer. The inner portion of the felt washer 15 is thus slightly compressed and prevents ring 16 from moving away from bearing 2 without imposing any appreciable additional pressure on the ring 16. The ring 16 is thus constantly pressed yieldingly against the bearing 2 by a combination of two forces, one due to the spring 17 and the other due to the compression of the washer 15.

The ring 16 also confines the felt washer 15 and holds it firmly in contact with the cylindrical portion 5. The felt washer is preferably soaked with lubricant.

The ring 16 is prevented from rotating with the bearing 2 by any suitable means, such as a lug 19 on the ring engaging a notch or recess 20 in the flange of the disc 11; see Figure 1.

All the parts are therefore non-rotatable with the exception of the bearing 2 and disc 1.

It is found that the combination of felt washer and metal ring arranged as described most effectively excludes dust and dirt from the interior of bearing for an indefinite period, even if the disc is used on sandy or muddy ground, and does not appreciably affect the freedom of rotation of the disc.

Figure 3:
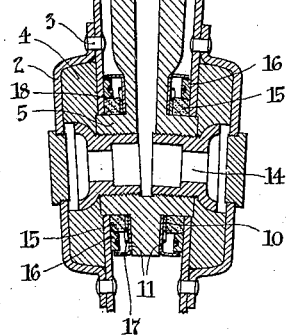
Figure 3 is a cross section of a modified form of the invention applied to a double disc seeding machine.

Figure 3 shows the invention applied to a double disc of a known type. Corresponding or equivalent parts are indicated by the same reference numerals and it is believed that this construction will be clearly understood without further description.

The illustrated forms of the invention are given by way of example only, and modifications within the scope of the appended claims may be made without departing from the invention.

I claim:

1. In combination with relatively rotatable supporting and bearing members, means for preventing the entry of dust between said members comprising a felt washer surrounding said support and engaging said bearing, and a metal ring engaging said bearing and having a tapered inner surface in contact with the outer periphery of said washer.

2. In combination with relatively rotatable supporting and bearing members, means for preventing the entry of dust between said members comprising a felt washer in dust-excluding engagement with both of said members, and a metal ring in dust-excluding engagement with said washer and one of said members, said ring being tapered where it engages said washer.

3. Dust-excluding means as claimed in claim 2, wherein a light compression spring is provided to act on said ring.

4. In combination with the disc of an agricultural machine a hollow cylindrical bearing rotatable with said disc, a relatively stationary cylindrical supporting member projecting from said bearing and having a flange mounted in said bearing, an arm carrying said supporting member, a disc clamped between said arm and said member, a slightly compressed felt washer between said last named disc and bearing and in dust-excluding engagement with said supporting member and said bearing, and a metal ring in dust-excluding engagement with said washer and bearing, the washer being compressed slightly by the ring.

5. Dust-excluding means as claimed in claim 4, wherein a spring is slightly compressed between said disc and said ring.

6. Dust-excluding means as claimed in claim 4, wherein the inner periphery of said ring is tapered to a diameter slightly smaller than the normal outer diameter of said washer.

In testimony whereof I have affixed my signature.

ERNEST BASEMAN.